United States Patent
Asahi et al.

(10) Patent No.: US 6,511,627 B1
(45) Date of Patent: Jan. 28, 2003

(54) METHOD OF FORMING A COMPLEX PROFILE OF UNEVEN DEPRESSIONS IN THE SURFACE OF A WORKPIECE BY ENERGY BEAM ABLATION

(75) Inventors: Nobuyuki Asahi, Hirakata (JP); Yuichi Uchida, Hirakata (JP); Masao Kubo, Nara (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/539,880

(22) Filed: Mar. 31, 2000

Related U.S. Application Data

(62) Division of application No. 09/119,745, filed on Jul. 21, 1998, now Pat. No. 6,120,725.

(30) Foreign Application Priority Data

Jul. 25, 1997 (JP) ............................................. 9-200592

(51) Int. Cl.[7] .............................................. B23K 26/00
(52) U.S. Cl. .............. 264/400; 219/121.61; 219/121.66
(58) Field of Search ...................... 264/400; 219/121.73, 219/121.75, 121.74, 121.76, 121.8, 1.37, 121.6, 121.61, 121.66

(56) References Cited

U.S. PATENT DOCUMENTS

| | | | |
|---|---|---|---|
| 4,128,752 A | 12/1978 | Gravel | |
| 4,758,304 A | 7/1988 | McNeil et al. | 156/626 |
| 4,786,358 A | 11/1988 | Yamazaki et al. | 156/643 |
| 4,842,782 A | 6/1989 | Portney et al. | |
| 4,964,720 A | 10/1990 | Torigoe | 353/122 |
| 5,227,915 A | 7/1993 | Grossinger et al. | 359/565 |
| 5,661,744 A | 8/1997 | Murakami et al. | 372/57 |
| 5,811,021 A | 9/1998 | Zarowin et al. | 216/67 |
| 5,811,754 A | 9/1998 | Nakatani et al. | 219/121.83 |
| 5,828,491 A | 10/1998 | Neuman et al. | 359/565 |
| 6,008,914 A | * 12/1999 | Sasagawa et al. | 359/29 |

* cited by examiner

Primary Examiner—Stefan Staicovici
(74) Attorney, Agent, or Firm—Rader, Fishman & Grauer, PLLC

(57) ABSTRACT

A method of forming a complex profile of uneven depressions in the surface of the ablatable workpiece by laser ablation with the use of a simple optics or a mask of a simple configuration. The method includes the steps of determining the complex profile in accordance with a particular feature to be given to the surface of the workpiece, then dividing the complex profile into more than one simple and regular waveform patterns of different characteristics, and irradiating an energy beam to the surface of the work piece to form the individual regular waveform patterns successively in an superimposed fashion by ablation in the surface of the workpiece. Accordingly, the desired complex profile can be easily obtained at an improved efficiency and at a moderate cost.

4 Claims, 7 Drawing Sheets

FIG. 4
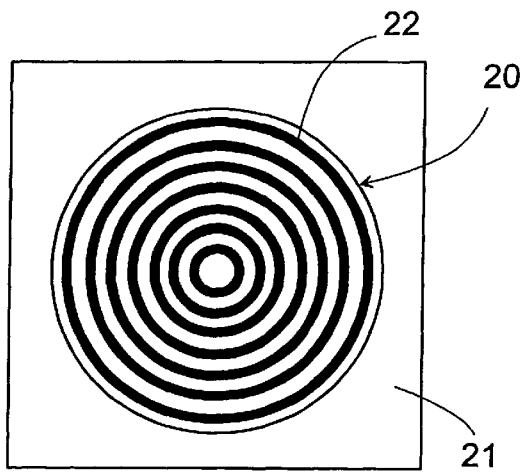
FIG. 6
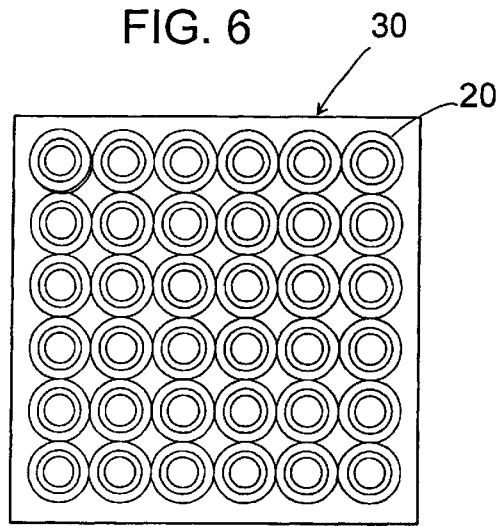
FIG. 5
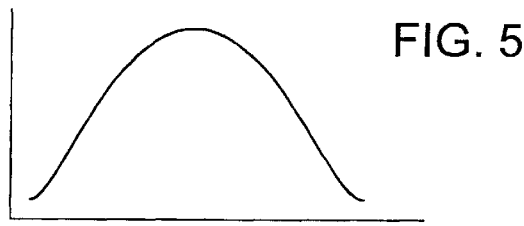
beam intensity distribution
FIG. 7
FIG. 8B
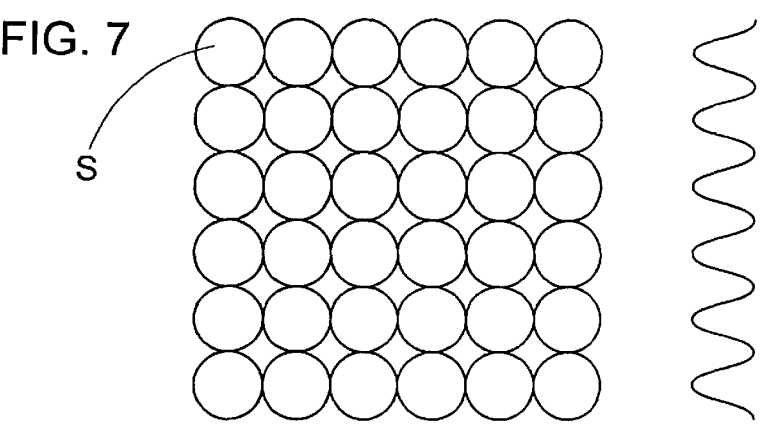
FIG. 8A

FIG. 9A
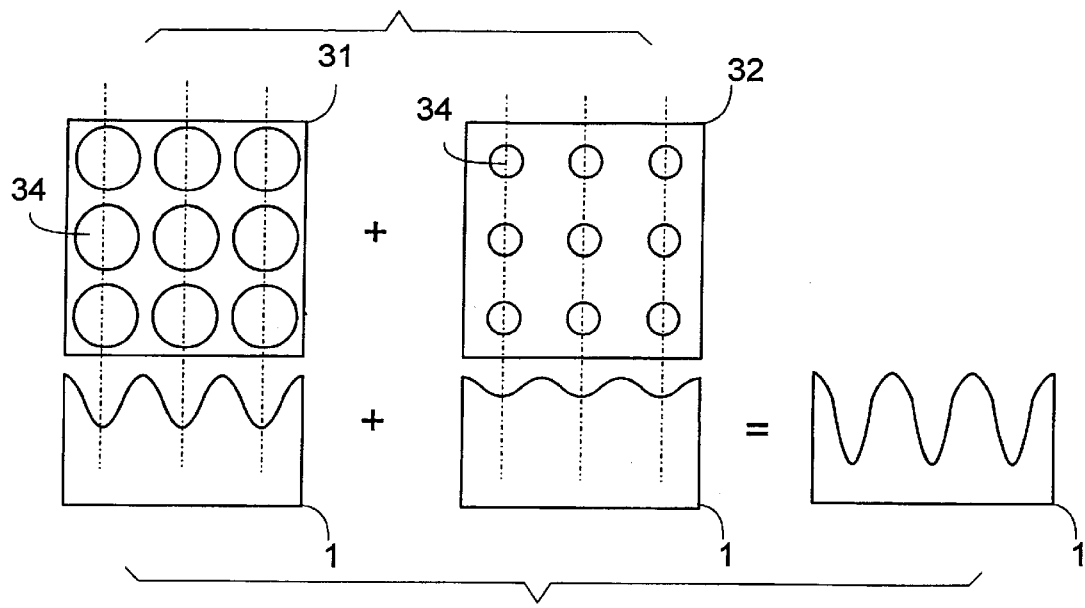
FIG. 9B
FIG. 10A
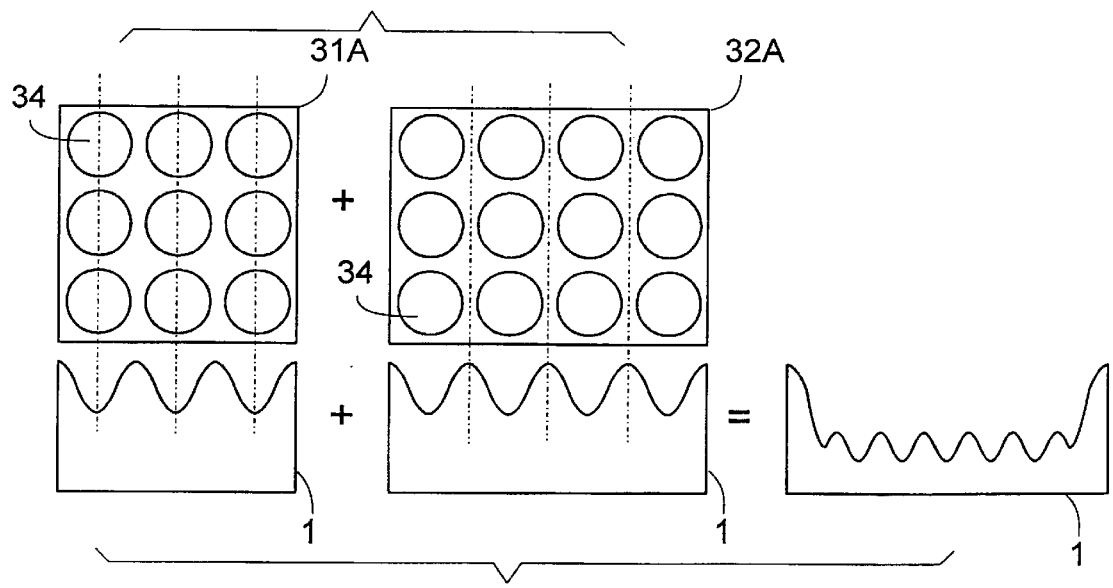
FIG. 10B

METHOD OF FORMING A COMPLEX PROFILE OF UNEVEN DEPRESSIONS IN THE SURFACE OF A WORKPIECE BY ENERGY BEAM ABLATION

This application is a divisional application of U.S. patent application Ser. No. 09/119,745, filed Jul. 21, 1998, now U.S. Pat. No. 6,120,725 the disclosure of which is hereby incorporated by reference.

BACKGROUND OF THE INVENTION

1. Field of the Invention

The present invention is directed to a method of forming a complex profile defined by a number of even depressions in the surface of a workpiece, and more particularly to such a method of using an energy beam for providing a microstructured profile in the surface of an ablatable workpiece.

2. Description of the Prior Art

The use of an energy beam has been proposed to producing a desired microstructure profile in a workpiece by ablation, as disclosed in U.S. Pat. Nos. 4,128,752 and 4,842,782. In order to give a complex profile of uneven depressions distributed over a wide range of the surface, the energy beam should be precisely controlled in combination with a mask of complicate configuration. However, the mask of complicate configuration is difficult to fabricate and is only possible at a considerably high manufacturing cost. Hence, there is a demand to realize the complex profile in the surface of the workpiece expeditiously in a cost effective manner.

SUMMARY OF THE INVENTION

The present invention has been achieved to satisfy the above demand and provides a method of forming a complex profile of uneven depressions in the surface of the ablatable workpiece with the use of a simple optics or a mask of a simple configuration. The method comprises the steps of determining the complex profile in accordance with a particular feature to be given to the surface of the workpiece, then dividing the complex profile into more than one simple and regular waveform patterns of different characteristics, and irradiating an energy beam to the surface of the work piece to form the individual regular waveform patterns successively in an superimposed fashion by ablation in the surface of the workpiece. Accordingly, the desired complex profile can be easily obtained at an improved efficiency and at a moderate cost.

Preferably, the complex profile is divided into the regular patterns of sinusoidal waveforms by approximation using an orthogonal transformation, such as by the Fourier analysis.

A mask is utilized which includes a plurality of concentric opaque annuluses so as to image a one-cycle fraction of the regular waveform pattern on the workpiece by diffraction of the energy beam passing through the mask and an optics. The workpiece is shifted relative to the mask and optics to make the one-cycle fractions continuous to realize the regular waveform pattern. Another regular waveform pattern may be imaged successively on the workpiece by varying a magnification of the optics with the use of the same mask or by the use of a separate mask of different characteristics. Further, it is preferred to use a mask including an array of masking units each comprising the concentric opaque annuluses.

Further, it is preferred to adjust beam intensity to give a greater beam intensity directed towards sidewalls of the depression being made than towards a tip and a valley of the depression in order to precisely form the sinusoidal wave pattern.

Further, a deposited mask on the surface of the workpiece may be utilized for imaging one of the regular waveform patterns on the workpiece. The deposited mask includes an array of masking units each comprising a plurality of adjoining masking annuluses of different degrees of transparency to the energy beam arranged concentrically around a center opening. The energy beam incident to the deposited mask is controlled to image another regular waveform pattern in the absence of the deposited mask is irradiated through the deposited mask to form the complex profile. Thus, the complex profile can be readily realized by a single operation of scanning the energy beam onto the surface of the workpiece.

Instead of using the mask, it is possible to use the optics includes a special lens which distributes the energy beam into a plurality of beam spots on the surface of said workpiece each having a regularly varying beam intensity. The beam spots are arranged uniformly in an array so as to define any one of the regular waveform patterns by the array of the beam spots. The optics is adjusted to vary its magnification to image one of the regular waveform pattern firstly at a first magnification on the surface of the workpiece and then image another waveform pattern on the same surface at the second magnification. Thus, the desired complex profile can be realized with two or more steps of imaging the waveform patterns at varying magnification on the surface of the workpiece.

The energy beam is preferably a laser beam of a suitable pulsation frequency. The surface of the workpiece may be scanned by moving the laser beam in synchronism with the pulsation frequency to provide the complex profile over a wide range. Alternatively, the workpiece may be moved with the optics being fixed to provide the complex profile over a wide range. The laser beam utilized in the method of the present invention is preferred to have a short wavelength and/or short pulse width in order to enable precise laser ablation.

These and still other objects and advantageous features of the present invention will become apparent from the following description of the preferred embodiments when taken in conjunction with the attached drawings.

BRIEF DESCRIPTION OF THE DRAWINGS

FIG. 4 is a plan view of a mask utilized in the above system;

FIG. 5 is a chart illustrating an intensity of the beam diffracted through the mask of FIG. 4;

FIG. 6 is a schematic plan view of another mask for use in the above system;

FIG. 7 is a schematic plane view of the image of the mask projected on the surface of the workpiece;

FIGS. 8A and 8B are schematic view illustrating sections of the waveform pattern formed in the surface of the workpiece;

FIG. 9A illustrates plan views of two different masks utilized in the above system for imaging separate waveform patterns;

FIG. 9B illustrates sectional views of the surfaces of the workpiece to be formed respectively by the masks of FIG. 9A and the resulting complex profile;

FIG. 10A illustrates plan views of two different masks utilized in the above system for imaging separate waveform patterns;

FIG. 10B illustrates sectional views of the surfaces of the workpiece to be formed respectively by the masks of FIG. 10A and the resulting complex profile;

DESCRIPTION OF THE EMBODIMENTS

Figure 1:
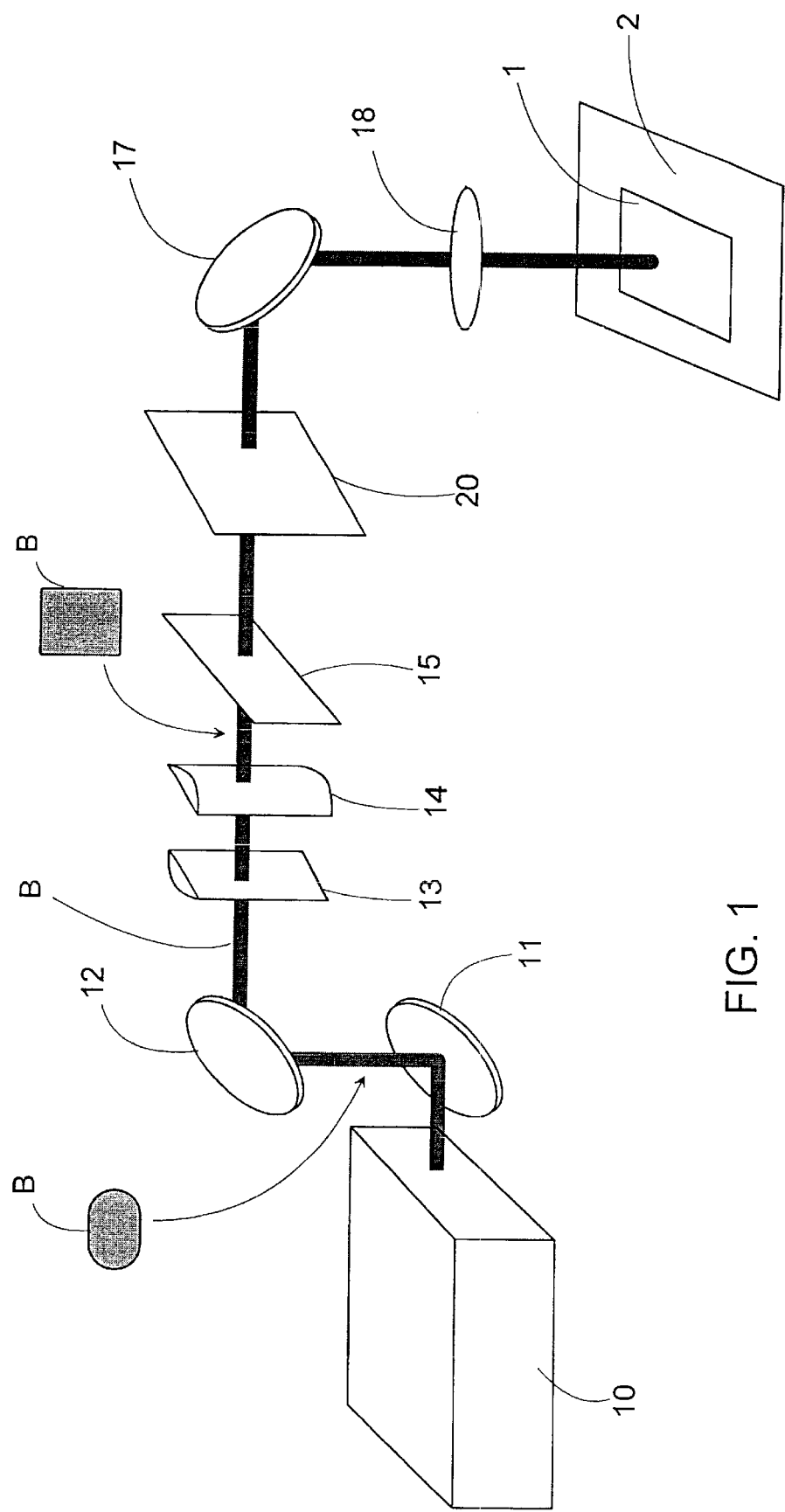
FIG. 1 is a schematic view illustrating a system of carrying out a method of forming a complex profile of uneven depressions in the surface of a work piece in accordance with a first embodiment of the present invention.

Referring now to FIG. 1, there is shown a system of forming a complex profile of uneven depressions in the surface of a workpiece. The technique disclosed herein can be applied to manufactures of a light diffuser plate for a lamp, a part having a microstructure, tribological surface, or any complicated three-dimensional configurations. More particularly, the present method can be utilized to fabricate the light diffuser plate or a minute optical lens having a complex profile of uneven depressions distributed at a pitch of 1 to 50 μm and an aspect ratio of 0.6 to 2.0, to fabricate micromachine parts having a complex profile of uneven depressions distributed at a pitch of 0.01 to 50 μm and an aspect ratio of 0.1 to 0.5, and to fabricate a high-efficiency micro diffraction lens for use in an infrared or visible light sensor having a complex profile of uneven depressions distributed at a pitch of about 0.5 μm and a depth of 0.5 μm.

The system comprises an energy beam source 10 generating an energy beam for processing the workpiece 1 by ablation. The beam source 10 is preferred to provide a pulsation short-wave pulse, particularly a KrF excimer pulsating laser having a wavelength of 248 nanometers, and a pulse width of 30 nanoseconds. Any other laser such as high-peak $CO_2$ gas laser and YAG laser may be utilized in consideration of compatibility with the workpiece 1.

Figure 2A:
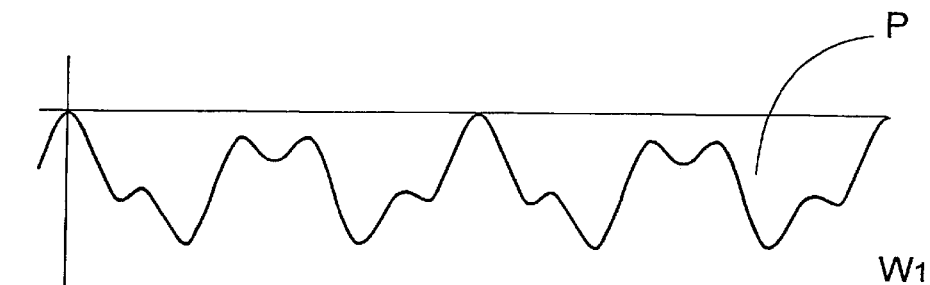
FIG. 2A is a chart of the complex profile.
Figure 2B:
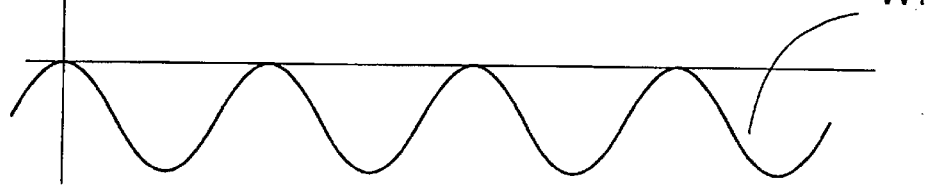
FIGS. 2B and 2C are charts of regular waveform patterns divided from the profile of FIG. 2A.
Figure 2C:
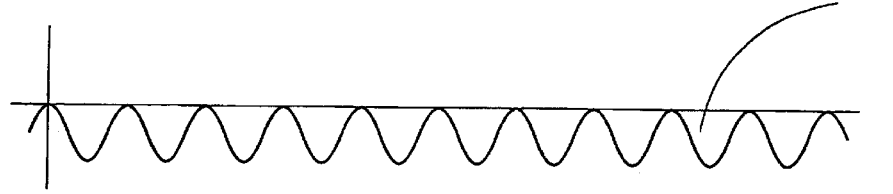

The workpiece 1 is made of an ablatable material including polymethylmetacrylate (PN4MA), polycarbonate (PC), polyester, polystyrene, cellulose plastics, polyimide, liquid crystal polymer, silicon nitride, alumina, boron nitride, gold, copper alloy, tungsten, and aluminum. The complex profile is determined such as by a computer simulation in accordance with desired characteristics to be given by the profile. One example of the complex profile P is shown in FIG. 2A to include a number of uneven depressions distributed continuously. The complex profile P is divided into two simple sinusoidal waveform patterns W1 and W2, as shown in FIGS. 2B and 2C, by the Fourier approximation. Thus divided waveform patterns W1 and W2 are of different pitches or frequencies as well as different height or amplitude. Depending upon the complexity and precision being required, the profile P may be divided into three or more sinusoidal waveform patterns selected from those represented by the Fourier series of the complex profile. In this instance, the first and second waveform patterns W1 and W2 can be represented by the following functions f(x) and g(x), respectively:

$$f(x) = -15 + 15\sin\left(\frac{2\pi}{30}x\right)$$

$$g(x) = -8 + 8\sin\left(\frac{2\pi}{24}x\right)$$

Thus, the complex profile can be represented by h(x)=f(x)+g(x).

Thus obtained regular sinusoidal waveform patterns W1 and W2 are formed in the surface of the workpiece 1 successively and in a superimposed fashion to reproduce the complicate profile in the surface by the use of an optics. The optics includes a pair of fixed mirrors 11 and 12 directing the laser beam B from the source 10 to pass through a pair of cylindrical lenses 13 and 14 which shapes the laser beam of a generally rectangular section (25 mm×8 mm) into a square section (25 mm×25 mm). Thus shaped laser beam B is directed through an attenuator 15 and a mask 20 followed by being reflected by a scanning mirror 17 to proceed through a converging lens 18 towards the workpiece 1 mounted on a table 2. The mask 20 may be positioned between the scanning mirror 17 and the converging lens 18.

FIG. 4 shows one typical example of the mask 20 utilized to image one of the sinusoidal waveform patterns on the surface of the workpiece 1. The mask 20 comprises a transparent quartz substrate 21 deposited with a circular pattern comprising a plurality of opaque annuluses 22 of chromium concentrically arranged within a circle of 300 μm diameter. The remaining area is also deposited with chrominum to be opaque. The opaque annuluses have 2 μm width and spaced by 2 μm from each other to provide corresponding transparent annuluses therebetween for passing the laser beam. The laser beam passing through the mask 20 is diffracted to produce a diffracted pattern of beam intensity in the form of a generally one-cycle sinusoidal waveform, as shown in FIG. 5. Thus diffracted sinusoidal waveform pattern is imaged on the workpiece 1 at a magnification factor of 1/10 through the converging lens 18 having a focal length of 100 mm, while the scanning mirror 17 oscillates at a suitable frequency to scan the surface of the workpiece by the laser beam of the diffracted pattern over a wide range, i.e., 1×1 mm area. Thus, the laser beam of varying intensity within the confines of the outermost opaque annulus is irradiated on the surface of the workpiece to form an array of beam spots S, as shown in FIG. 7, thereby forming by laser ablation one of the waveform patterns W1 and W2 extending along mutually perpendicular directions of the workpiece, as shown in FIGS. 8A and 8B. In this instance, the attenuator 15 is adjusted to give an energy density of 5.0 $mJ/mm^2$, and 30 shots of the laser beam is applied through the mask to form the corresponding waveform pattern.

Instead of using the mask of FIG. 4, it is equally possible to use a collective mask 30 which, as shown in FIG. 6, includes on a substrate an array of masking units each corresponding to the mask 20 composed of a plurality of pique annuluses. The remaining area of the substrate is deposited with chromium to be opaque.

After forming the first waveform pattern W1, the optics is adjusted to reduce its magnification factor to form the second waveform pattern W2 in the surface of the workpiece in a superimposed fashion on the first waveform pattern W1, realizing the complex profile of uneven depressions. An additional pattern or patterns of different waveforms may be successively formed at a different magnification factor as necessary for providing more precise complex profile. It is noted in this connection that more accurate complex profile can be reproduced when forming the waveform pattern of larger amplitude firstly than the successively formed waveform.

Rather than varying the magnification factor, it is possible to use different masks for imaging individual sinusoidal waveform patterns on the same surface of the workpiece. For example, three masks are utilized to image the three waveform patterns W1 of 30 μm pitch and 9 μm height, W2 of 12 μm pitch and 3 μm height, and W3 of 5 μm pitch and 1.3 μm height, respectively on the workpiece 1, which are combined to reproduce a complex profile. The first mask comprises an array of circular masking units each having a diameter of 240 μm and spaced from the adjacent unit by a distance of 300 μm measured between the centers of the adjacent units. Each masking unit is of the same configuration as that of FIG. 4. The second mask comprises an array of the like masking units of 96 μm diameter spaced by a center-to-center distance of 120 μm. The third mask comprises an array of the like masking units of 40 μm diameter spaced by a center-to-center distance of 50 μm. 30 pulses of the laser beam of 5.0 mJ/mm$^2$ is irradiated through the first mask to the surface of the workpiece, then 10 pulses of the laser beam is irradiated through the second mask and 4 pulses of the laser beam is irradiated through the mask, all at a magnification factor of $\frac{1}{10}$.

FIGS. 9A and 9B illustrate another example of forming the like complex profile with the use of two separate masks 31 and 32 including arrays of circular openings 34 which are of different diameters but arranged by the same pitches. The first and second masks 31 and 32 are alone responsible for forming the first and second waveform patterns as shown in FIG. 9B immediately below the respective masks shown in FIG. 9A. The resulting surface configuration of complex profile is shown in the right of FIG. 9B.

FIGS. 10A and 10B illustrate a further example of forming the like complex profile with the use of two separate masks 31A and 32A having arrays of circular openings 34A which are of the same diameters but laterally offset by a phase of 180°. The first and second masks 31A and 32A are alone responsible for forming the first and second waveform patterns as shown in FIG. 10B immediately below the respective masks shown in FIG. 10A. The resulting surface configuration of complex profile is shown in the right of FIG. 10B. The circular openings 34 and 34A have a diameter considerably smaller than that of the incident laser beam, so as to form rounded depressions in the surface of the workpiece by moving the laser beam across the openings. Since the amount of the laser beam passing through the openings is made greater towards the center of the opening than at the periphery thereof, the resulting depressions made by laser ablation have sections of generally sinusoidal waveform pattern. It is also possible to substitute the mask 20 as shown in FIG. 4 for the individual circular openings 34 and 34A.

Figure 11A:
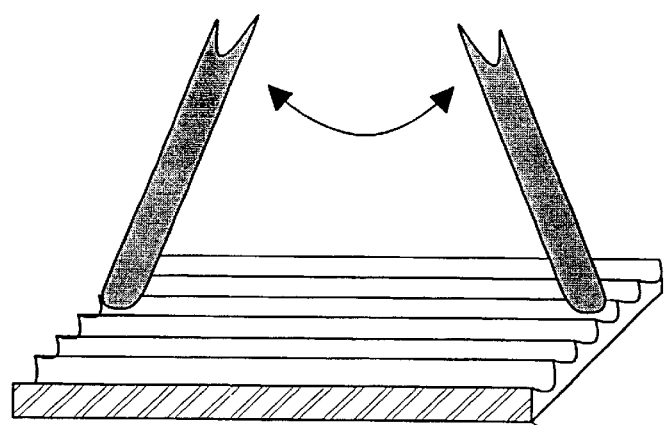
FIGS. 11A and 11B illustrate typical modes respectively for scanning the laser beam to form the complex profile along one direction of the workpiece and along two mutually perpendicular directions.
Figure 11B:
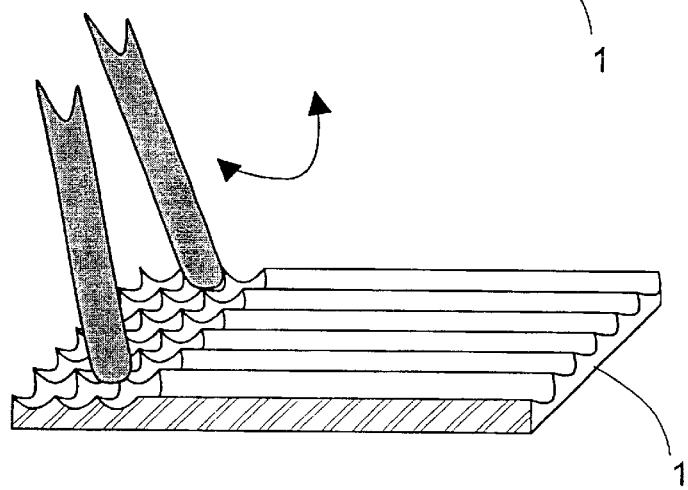
Figure 12A:
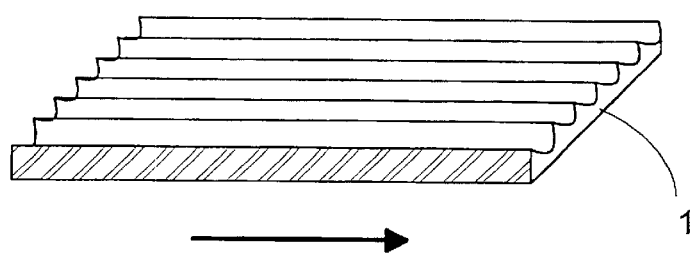
FIG. 12A and 12B illustrate typical modes of shifting the workpiece to form the complex profile along one direction of the workpiece and along two mutually perpendicular directions.
Figure 12B:
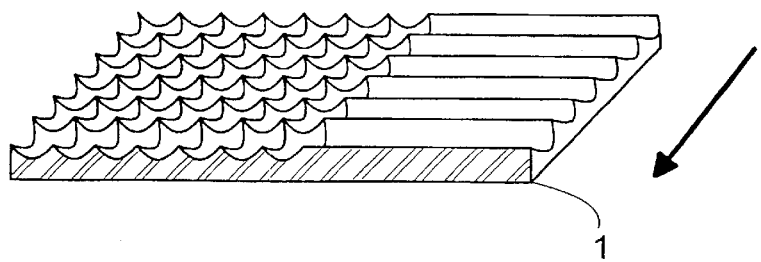

In order to form the waveform patterns and therefore the resulting complex profile over a wide range, the laser beam can be scanned in one direction and thereafter in the perpendicular direction as shown in FIGS. 11A and 11B. After forming the patterns over a wide range, for example, by a distance corresponding to several cycles of the waveform, the workpiece 1 is shifted relative to the optics. Alternately, it is possible to shift the workpiece in a horizontal plane while the laser beam is being irradiated to the workpiece with the optics being fixed, as shown in FIGS. 12A and 12B. In this scheme, the table 2 carrying the workpiece 1 is shifted in synchronous with the pulsation of the laser beam. For example, the table is shifted at a speed of 13 mm/min while irradiating the laser beam pulsating at a frequency of 150 Hz. The scheme of shifting the table is advantageous in reproducing precise complex profile without causing any substantial aberration of the optics.

Figure 13:
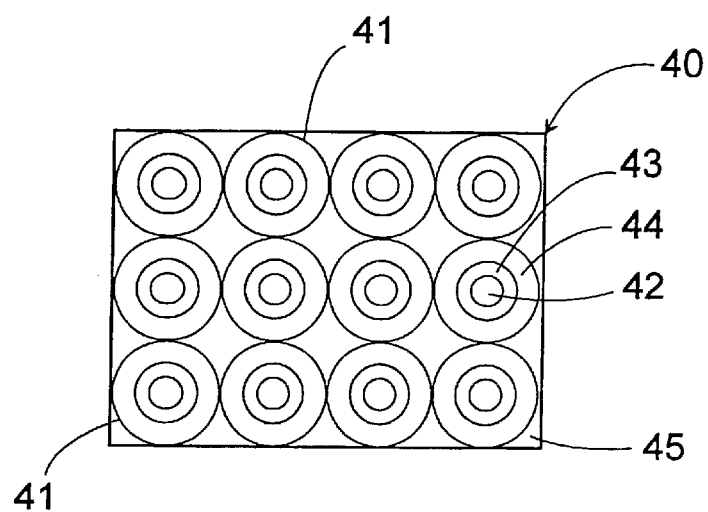
FIG. 13 is a plan view of a deposited mask adapted on the surface of a workpiece for imaging one regular waveform pattern.
Figure 14:
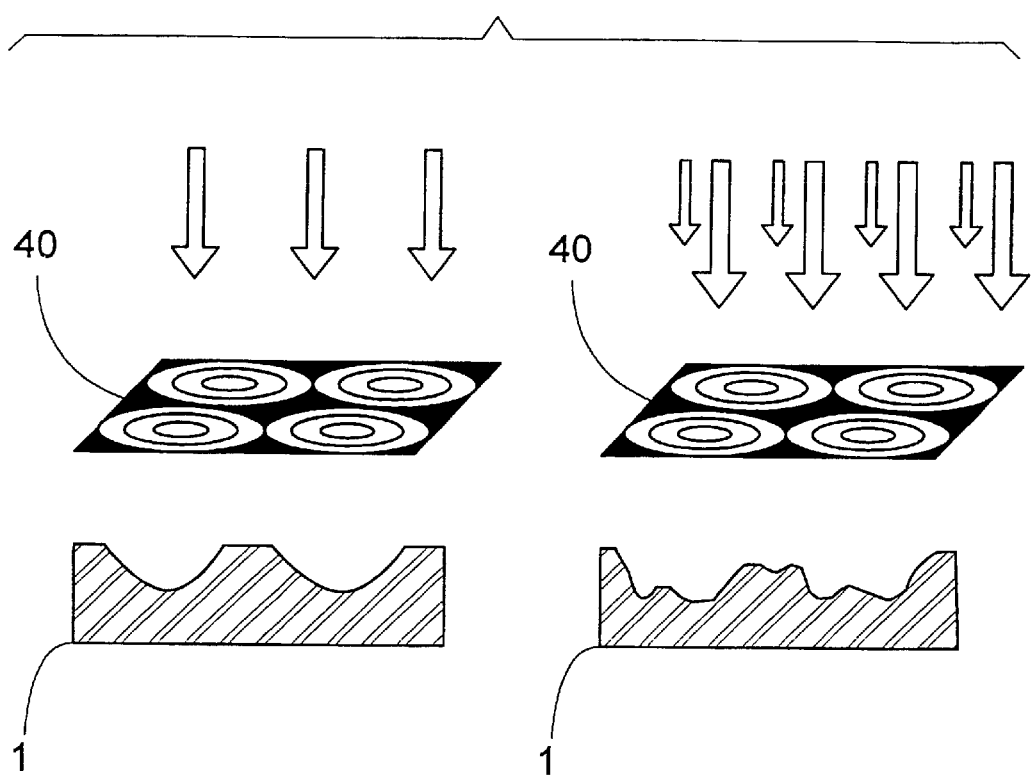
FIG. 14 illustrates a manner of forming the complex profile with the use of the deposited mask of FIG. 13.

FIG. 13 shows a deposited mask 40 which may be utilized in the method of the present invention. The mask 40 is deposited on a flat surface of the workpiece 1 prior to being irradiated by the laser beam in order to image one of the regular waveform patterns. The mask 40 includes an array of masking units 41 each comprising two adjoining masking annuluses 43 and 44 of different degrees of transparency arranged concentrically around a center opening 42 of 30 μm diameter. The inner annulus 43 is formed by deposition of Ag extending over an area between 30 μm to 70 μm in diameter and having a thickness of 1000 Å, and the outer annulus 44 is formed by deposition of Cu extending over an area between 70 μm to 100 μm and having a thickness of 1000 Å. The other area 45 is formed by deposition of Al in 5000 Å thickness. Thus formed masking units 41 are arranged by a center-to-center distance of 100 μm. The inner annulus of Ag 43, the outer annulus of Cu 44, and the remaining area 45 of Al exhibit different degrees of transparency respectively at 72%, 59%, and 9% with respect to the KrF laser beam, such that the irradiation of the laser beam of uniform intensity over the entire area of the deposited mask would image a first sinusoidal waveform pattern having a 100 μm pitch and a height of 3 μm in the surface of the workpiece 1, as shown in the left-hand portions of FIG. 14. Actually, the incident laser beam, of which intensity is adjusted to otherwise image a second waveform pattern through the mask to form the corresponding waveform pattern. having a pitch of 50 μm and a height of 1 μm, is irradiated through the deposited mask 40 to form the complex profile composed of the first and second waveform patterns, as shown in right-hand portions of FIG. 14. With this technique, the complex profile can be obtained only by the one time irradiation of the laser beam to the area of the surface covered by the deposited mask 40. The incident laser beam of varying intensity can be provided by the use of a mask, a special lens or any other scheme in the optics.

Figure 15:
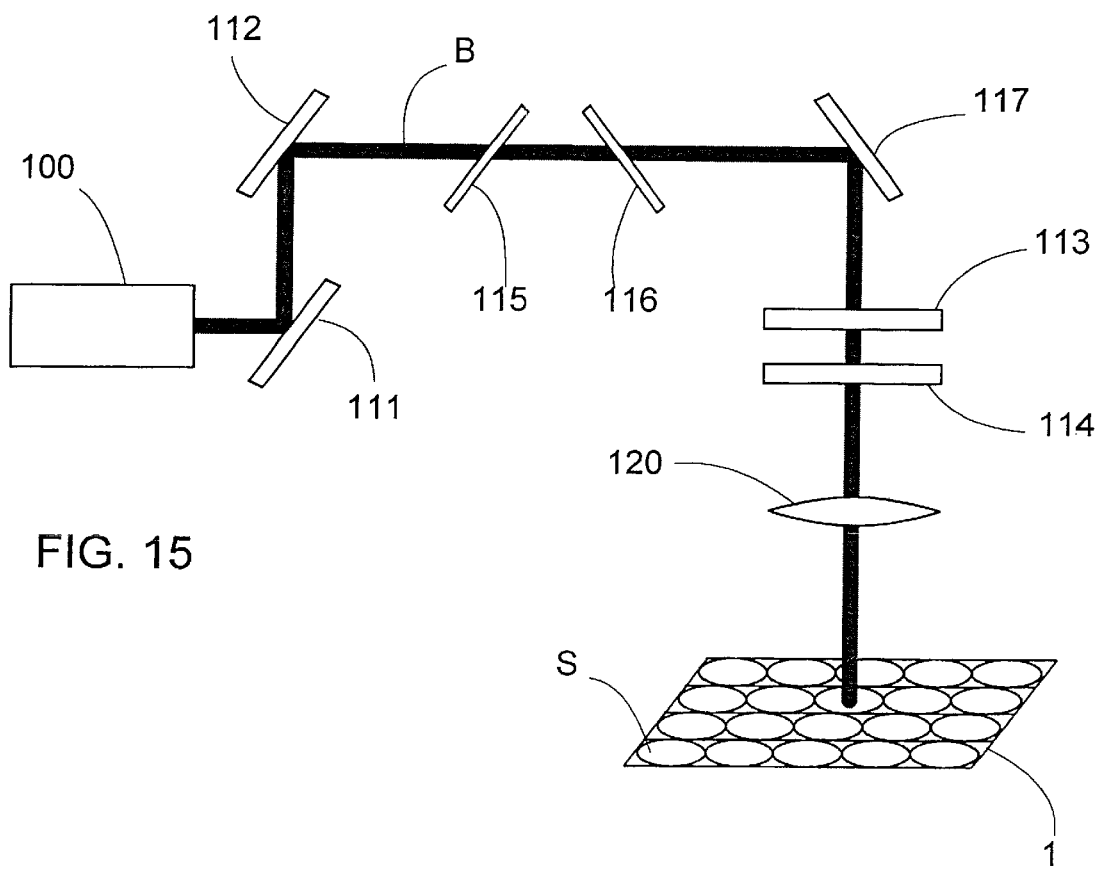
FIG. 15 is a schematic view illustrating a system of carrying out a method of forming a complex profile of uneven depressions in the surface of a work piece in accordance with another embodiment of the present invention.

FIG. 15 shows another system of carrying out the method of the present invention. The system comprises an energy beam source 100 generating a laser beam of a short pulse wave, a pair of fixed mirrors 111 and 112 directing the laser beam B from the source 100 to pass through a pair of attenuators 115 and 116 to a scanning mirror 117. Thereafter, the laser beam is directed through a pair of cylindrical lenses 113 and 114 which shapes the laser beam of a generally rectangular section (25 mm×8 mm) into a square section (25 mm×25 mm). Thus shaped laser beam B is irradiated through a fly's eye lens 120 to the surface of the workpiece 1 mounted on a table. The fly's eye lens 120 comprises an array of 25 minute convex lenses for dividing the incident laser beam of the generally square cross-section into a corresponding array of beam spots, which are identical to those shown in FIG. 7 obtained by the use of the mask 30 of FIG. 6, and have regularly varying beam intensity in each of the beam spots for providing a sinusoidal waveform pattern in the surface of the workpiece. Thus, the fly's eye lens 120 can image different sinusoidal waveform patterns on the surface of the workpiece 1 by varying magnification factor of the optics. The laser beam is adjusted to give an energy density of 5.0 mJ/mm² by the attenuators 115 and 116 to realize in the surface of the polycarbonate-made workpiece 1 a complex profile composed of a first waveform pattern having a pitch of 1000 μm and a height of 50 μm, a second waveform pattern having a pitch of 500 μm and a height of 30 μm, and a third waveform pattern having a pitch of 250 μm and a height of 5 μm. The first pattern is made by irradiation of 170 pulses of the laser beam at a magnification factor of ⅕ through the fly's eye lens 120. Then, the second pattern is superimposed on the first pattern by irradiation of 100 pulses of the laser beam at a magnification factor of ⅒ through the lens 120. Finally, the third pattern is superimposed on the resulting complex pattern by irradiation of 17 pulses of the laser beam at a magnification factor of 1/20 through the lens 120, thereby realizing the complex profile as desired. Imaging of the first, second, and third patterns is made by scanning the laser beam through the fly's eye lens 120 by operating the scanning mirror 117, and formed on the square areas of 25 mm², 6.25 mm², and 1.5625 mm², respectively by the one scanning operation. Accordingly, the table mounting the workpiece 1 is shifted in a horizontal plane with respect to the optics in order to realize the complex profile over an extended area of the workpiece.

Figure 16A:
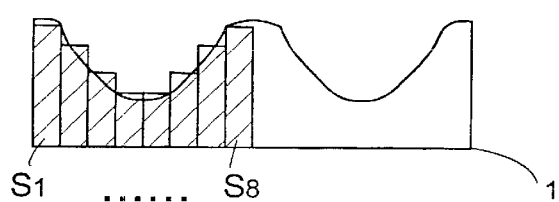
FIGS. 16A, 16B, and 16C are schematic views illustrating different ways which are utilized in the present invention to form the regular waveform pattern in the surface of the workpiece.
Figure 16B:
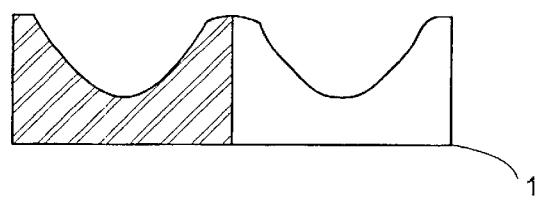
Figure 16C:
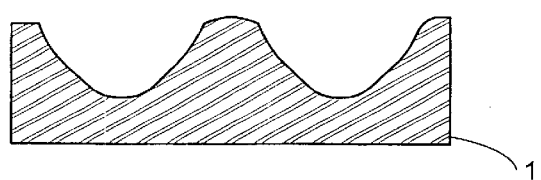

Instead of using the mask or the fly's eye lens as disclosed herein, it is readily possible to irradiate the laser beam directly on the surface of the workpiece for giving a sinusoidal waveform pattern on a basis of varying the intensity of the laser beam while shifting the beam spot across the surface of the workpiece. FIG. 16A illustrates a simple way of forming the sinusoidal waveform pattern by direct irradiation of the laser beam. One cycle of the intended sinusoidal waveform is divided into 8 segments S1 to S8 at each of which the ablation depth is adjusted by the laser intensity in correspondence to an average amplitude within each segment. Thus, a complex profile composed of two or more sinusoidal waveform patterns can be realized by simply repeating the steps of irradiating the laser beam by varying beam intensity and shifting the workpiece relative to the beam in a manner to trace simple sinusoidal waveform patterns. Although the laser beam can be easily adjusted to vary its intensity for varying beam spots when forming the sinusoidal waveform pattern, it is still advantageous for improving an efficiency of forming the complex profile to use the mask 20 of FIG. 4 for production of one cycle of the sinusoidal waveform at one time, as shown FIG. 16B, or to use the mask 30 of FIG. 6 or the fly's eye lens 120 of FIG. 15 for production of two or more cycles of the sinusoidal waveforms as shown in FIG. 16C.

Figure 3:
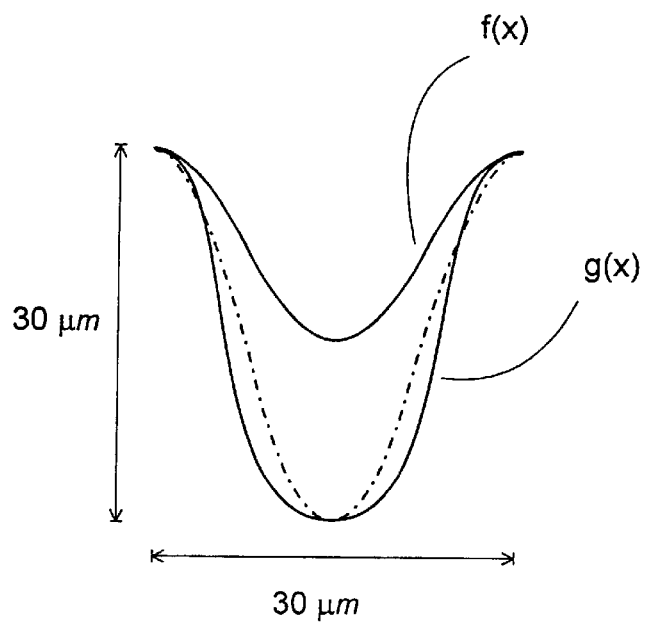
FIG. 3 is a chart illustrating a manner of tailoring a depression of the regular waveform pattern.

When forming the sinusoidal waveform pattern by laser ablation, the depression of the pattern may have sidewalls of which configuration does not accurately conform to the sinusoidal waveform, as indicated by a phantom line in FIG. 3, due to lowering intensity of the laser beam incident to the inclination of the sidewalls. In order to avoid this undesired effect and to form the sinusoidal waveform pattern more accurately, the laser beam directed to the sidewalls may be adjusted to increase its intensity to such an extent as to provide the accurate waveform pattern. In doing so, it is effective to repeat the steps of forming the same waveform pattern twice. For example, when the desired sinusoidal pattern is represented by the following function g(x):

$$g(x) = 15\sin\left(\frac{2\pi}{30}x\right),$$

then, the steps of forming the sinusoidal waveform pattern represented by the following function f(x) is repeated to approximate the waveform of g(x)

$$f(x) = 7.5\sin\left(\frac{2\pi}{30}x\right)$$

The more precise approximation of the sinusoidal waveform could be obtained by increasing the number of steps of forming the same waveform pattern. The sinusoidal waveform f(x) is obtained by the use of the mask and fly's eye lens or by controlling the intensity of the laser beam. Further, a single sinusoidal waveform pattern may be formed by the use of two or more masks or fly's eye lenses which are designed to compensate for the reduction of the beam intensity directed to the sidewalls of the depression being made.

It should be noted that the features as explained hereinbefore may be suitable combined for reproduction of the complex profile. Further, it is also noted that the method of the present invention can be applied to manufacture of a master mold for reproducing an article having a microstructured surface. In this application, a well-known technique frequently referred to as LIGA technique could be utilized to firstly form a microstructured workpiece, then forming the master mold by electroforming. When the depressions of the complex profile becomes minute to have an average pitch of less than several micrometers and have an aspect ratio of 1.0 or more, such microstructure may be difficult to be reproduced with the use of the master mold. In such case, the master mold is preferred to give a basic one of the waveform pattern to the article which is subsequently treated to form another waveform pattern or patterns in a superimposed fashion to the article to give a final complex profile thereto.

What is claimed is:

1. A method for forming a profile defined by a series of uneven depressions in a surface of an ablatable workpiece, the method comprising the steps of:

determining the desired profile of the series of uneven depressions;

determining by approximation using an orthogonal transformation a first sinusoidal waveform and at least a second sinusoidal waveform different from the first sinusoidal waveform that, when superimposed on each other, represent the desired profile;

ablating the surface of the workpiece by irradiating an energy beam onto and across the surface of the workpiece in a first direction at a first beam intensity representative of the first sinusoidal waveform; and ablating the surface of the workpiece by irradiating the energy beam onto and across the surface of the workpiece previously ablated in a perpendicular direction to the first direction at a second beam intensity representative of the second sinusoidal waveform to form the series of uneven depressions in the desired profile.

2. The method as set forth in claim 1, wherein said profile is divided into said waveform patterns by approximation using an orthogonal transformation.

3. The method as set forth in claim 2, wherein said energy beam directed to sidewalls of each depression being formed by ablation is adjusted to have a greater beam intensity than the energy beam directed to a tip and a valley of the depression.

4. A method according to claim 1, wherein the first sinusoidal waveform has a first frequency and a first amplitude and the at least second sinusoidal waveform has a second frequency and a second amplitude, the at least one of the first and second frequencies and the first and second amplitudes are different from one another.

* * * * *